United States Patent
Lo et al.

(10) Patent No.: US 12,084,607 B2
(45) Date of Patent: Sep. 10, 2024

(54) SYSTEMS AND METHODS FOR FORMING AND USING AN ADHESIVE TAPE AND RELATED ARTICLES

(71) Applicant: BEMIS ASSOCIATES, INC., Shirley, MA (US)

(72) Inventors: Man Fai Lo, Hong Kong (CN); Stephen Topper, Barre, MA (US); Jared Ide, Medford, MA (US); Daryl Johnson, Fitchburg, MA (US)

(73) Assignee: BEMIS ASSOCIATES, INC., Shirley, MA (US)

( * ) Notice: Subject to any disclaimer, the term of this patent is extended or adjusted under 35 U.S.C. 154(b) by 0 days.

(21) Appl. No.: 18/309,276

(22) Filed: Apr. 28, 2023

(65) Prior Publication Data

US 2023/0348760 A1  Nov. 2, 2023

Related U.S. Application Data

(60) Continuation of application No. 17/565,984, filed on Dec. 30, 2021, now Pat. No. 11,674,058, which is a
(Continued)

(51) Int. Cl.
*C09J 7/50* (2018.01)
*B32B 7/14* (2006.01)
(Continued)

(52) U.S. Cl.
CPC ........ *C09J 7/50* (2018.01); *B32B 7/14* (2013.01); *B32B 37/06* (2013.01); *C08J 5/18* (2013.01);
(Continued)

(58) Field of Classification Search
CPC ......... B32B 5/024; B32B 5/022; B32B 37/06; B32B 7/14; C09J 2301/304;
(Continued)

(56) References Cited

U.S. PATENT DOCUMENTS

| 3,956,553 A | 5/1976 | Palmer et al. |
| 4,393,117 A | 7/1983 | Stricker et al. |

(Continued)

FOREIGN PATENT DOCUMENTS

| CN | 1147798 A | 4/1997 |
| CN | 2539408 Y | 3/2003 |

(Continued)

OTHER PUBLICATIONS

Int'l Search Report and Written Opinion of the ISA/EP in PCT/US2018/051307; Mar. 11, 2019; 11 pgs.

*Primary Examiner* — Vishal I Patel
(74) *Attorney, Agent, or Firm* — Goodwin Procter LLP

(57) ABSTRACT

Systems and methods are described for manufacturing an adhesive tape. An example method includes: providing a plurality of adhesive webs, wherein each web includes a hot melt adhesive adhered to a backing material; providing a fabric web having a fabric material; guiding a first adhesive web from the plurality of adhesive webs into a first position proximate a first side of the fabric web; guiding a second adhesive web from the plurality of adhesive webs into a second position proximate a second side of the fabric web; applying heat and pressure to form a web of the baffle tape in which the first adhesive web is bonded to the first side of the fabric web and the second adhesive web is bonded to the second side of the fabric web; and rewinding the web of the baffle tape into a roll.

19 Claims, 10 Drawing Sheets

Related U.S. Application Data division of application No. 17/032,861, filed on Sep. 25, 2020, now Pat. No. 11,236,255, which is a continuation of application No. 16/867,910, filed on May 6, 2020, now Pat. No. 10,808,147, which is a division of application No. 16/692,269, filed on Nov. 22, 2019, now Pat. No. 10,676,650, which is a division of application No. 16/132,842, filed on Sep. 17, 2018, now Pat. No. 10,519,349.

(60) Provisional application No. 62/559,817, filed on Sep. 18, 2017.

(51) Int. Cl.
  *B32B 37/06* (2006.01)
  *C08J 5/18* (2006.01)
  *C09J 7/21* (2018.01)
  *C09J 7/35* (2018.01)
  *B32B 5/02* (2006.01)

(52) U.S. Cl.
  CPC . *C09J 7/21* (2018.01); *C09J 7/35* (2018.01); *B32B 5/022* (2013.01); *B32B 5/024* (2013.01); *C09J 2301/124* (2020.08); *C09J 2301/208* (2020.08); *C09J 2301/302* (2020.08); *C09J 2301/304* (2020.08)

(58) Field of Classification Search
  CPC ............ C09J 2301/302; C09J 2301/208; C09J 2301/124; C09J 7/21; C09J 7/35; C09J 7/50; C08J 5/18
  See application file for complete search history.

(56) References Cited

U.S. PATENT DOCUMENTS

| | | | |
|---|---|---|---|
| 4,683,593 A | 8/1987 | Langley | |
| 4,741,791 A | 5/1988 | Howard et al. | |
| 4,938,817 A | 7/1990 | Langley | |
| 5,464,488 A | 11/1995 | Servin | |
| 5,490,294 A | 2/1996 | Kramer | |
| 5,817,199 A | 10/1998 | Brennecke et al. | |
| 6,183,576 B1 | 2/2001 | Couillard et al. | |
| 6,473,910 B2 | 11/2002 | Creagan et al. | |
| 6,560,797 B2 | 5/2003 | Maturaporn | |
| 7,005,021 B2 | 2/2006 | Kramer | |
| 7,094,714 B2 | 8/2006 | Lap et al. | |
| 7,147,756 B2 | 12/2006 | Davenport | |
| 7,162,746 B2 | 1/2007 | Reynolds | |
| 7,386,898 B1 | 6/2008 | Brun | |
| 7,455,743 B2 | 11/2008 | Kramer et al. | |
| 7,695,579 B2 | 4/2010 | Kramer et al. | |
| 7,770,235 B2 | 8/2010 | Lepage et al. | |
| 8,057,878 B2 | 11/2011 | Lo et al. | |
| 8,241,729 B2 | 8/2012 | Conley et al. | |
| 8,435,617 B2 | 5/2013 | Hannon | |
| 8,765,255 B2 | 7/2014 | Conley et al. | |
| 8,828,167 B2 | 9/2014 | Hannon | |
| 9,017,505 B2 | 4/2015 | Gallagher | |
| 9,131,738 B2 | 9/2015 | Ly | |
| 9,392,825 B2 | 7/2016 | Pezzimenti et al. | |
| 9,439,464 B2 | 9/2016 | Sung | |
| 2003/0157853 A1 | 8/2003 | Huber | |
| 2005/0112976 A1 | 5/2005 | McMurray et al. | |
| 2005/0211369 A1 | 9/2005 | Aso et al. | |
| 2006/0150331 A1 | 7/2006 | Child et al. | |
| 2007/0181241 A1 | 8/2007 | Kramer et al. | |
| 2008/0307566 A1 | 12/2008 | Yeh | |
| 2009/0022929 A1 | 1/2009 | Kramer et al. | |
| 2009/0056870 A1 | 3/2009 | Glenn | |
| 2009/0089911 A1 | 4/2009 | Smith | |
| 2009/0123713 A1 | 5/2009 | Conley et al. | |
| 2009/0155543 A1 | 6/2009 | Fowler | |
| 2010/0086730 A1 | 4/2010 | Lo et al. | |
| 2010/0107333 A1 | 5/2010 | Ortlieb | |
| 2011/0094667 A1 | 4/2011 | Schulze et al. | |
| 2011/0311603 A1 | 12/2011 | Lucas | |
| 2012/0282425 A1 | 11/2012 | Gallagher | |
| 2013/0276201 A1 | 10/2013 | Pezzimenti | |
| 2013/0289512 A1 | 10/2013 | Rhodes et al. | |
| 2013/0298306 A1 | 11/2013 | Turner | |
| 2014/0190614 A1 | 7/2014 | Ma et al. | |
| 2014/0349057 A1 | 11/2014 | Blackford et al. | |
| 2015/0030797 A1* | 1/2015 | Seo | B32B 5/26 264/10 |
| 2015/0224738 A1 | 8/2015 | Gallagher | |
| 2016/0137885 A1* | 5/2016 | Maier | C09J 7/38 428/41.8 |
| 2016/0339664 A1 | 11/2016 | Gallagher | |
| 2016/0374408 A1 | 12/2016 | Seo | |
| 2017/0081562 A1 | 3/2017 | Rosenthal et al. | |
| 2017/0099893 A1 | 4/2017 | O'Sullivan et al. | |
| 2017/0106624 A1 | 4/2017 | Hak | |

FOREIGN PATENT DOCUMENTS

| | | |
|---|---|---|
| CN | 2891709 Y | 4/2007 |
| CN | 101486850 A | 7/2009 |
| CN | 201700424 U | 1/2011 |
| CN | 102057003 A | 5/2011 |
| CN | 204393394 U | 6/2015 |
| WO | WO-95/29115 A1 | 11/1995 |
| WO | WO-2007058964 A1 | 5/2007 |
| WO | WO-2012115413 A2 | 8/2012 |
| WO | WO-2017062281 A1 | 4/2017 |

* cited by examiner

SYSTEMS AND METHODS FOR FORMING AND USING AN ADHESIVE TAPE AND RELATED ARTICLES

CROSS-REFERENCE TO RELATED APPLICATIONS

This application is a continuation of U.S. patent application Ser. No. 17/565,984, filed Dec. 30, 2021, which is a divisional of U.S. patent application Ser. No. 17/032,861, filed Sep. 25, 2020 (issued as U.S. Pat. No. 11,236,255 on Feb. 1, 2022), which is a continuation of U.S. patent application Ser. No. 16/867,910, filed May 6, 2020 (issued as U.S. Pat. No. 10,808,147 on Oct. 20, 2020), which is a divisional of U.S. patent application Ser. No. 16/692,269, filed Nov. 22, 2019 (issued as U.S. Pat. No. 10,676,650 on Jun. 9, 2020), which is a divisional of U.S. patent application Ser. No. 16/132,842, filed Sep. 17, 2018 (issued as U.S. Pat. No. 10,519,349 on Dec. 31, 2019), which claims the benefit of U.S. Provisional Patent Application No. 62/559,817, filed Sep. 18, 2017, the entire contents of each of which are incorporated by reference herein.

TECHNICAL FIELD

In various embodiments, the invention relates to adhesive materials and, more particularly, to systems and methods for manufacturing and using an adhesive tape.

BACKGROUND

Hot melt adhesives (HMAs), such as thermoplastic polyurethanes (TPUs), are commonly used to form bonds between two or more substrates, such as fabrics, foams, plastics, and other composites and combinations. HMAs can exhibit high tensile strength, excellent flexibility and good abrasion resistance. HMA films can be used with a variety of manufacturing methods, ranging from hot-melt to flame lamination. Various welding operations, including ultrasonic, HF, RF and platen sealing, can be used to activate these films. HMAs can be used to form seams between fabric materials in garment manufacturing processes.

Insulated panels for use in outerwear, sleeping bags, and similar articles generally include a loose insulating material (e.g., down feathers) confined within chambers formed between inner and outer fabric layers. The chambers are typically formed by stitching or bonding the inner and outer fabric layers together to define edges of the chambers.

There is a need for improved systems and methods for manufacturing adhesive materials and using the adhesive materials to manufacture insulated panels.

SUMMARY OF THE INVENTION

Embodiments of the systems and methods described herein relate to the manufacture and use of an adhesive tape. In preferred examples, the adhesive tape is manufactured using a continuous web process in which webs of adhesive are guided into position relative to a fabric web and bonded to the fabric web in one or more laminators. The resulting adhesive tape can be used to manufacture insulated panels for use in outerwear, sleeping bags, and similar articles.

In general, in one aspect, the subject matter of this disclosure relates to a method of manufacturing a baffle tape. The method includes: providing a plurality of adhesive webs, each adhesive web including a hot melt adhesive adhered to a backing material; providing a fabric web that includes a fabric material; guiding a first adhesive web from the plurality of adhesive webs into a first position proximate a first side of the fabric web; guiding a second adhesive web from the plurality of adhesive webs into a second position proximate a second side of the fabric web; applying heat and pressure to form a web of the baffle tape having the first adhesive web bonded to the first side of the fabric web and the second adhesive web bonded to the second side of the fabric web; and rewinding the web of the baffle tape into a roll.

In certain examples, providing the plurality of adhesive webs includes unwinding at least one roll of adhesive material having the hot melt adhesive adhered to the backing material. Providing the plurality of adhesive webs can include slitting an initial adhesive web into the plurality adhesive webs. Providing the fabric web can include unwinding a roll of the fabric material. Providing the fabric web can include slitting an initial fabric web into a plurality of fabric webs including the fabric web. In some implementations, guiding the first adhesive web includes directing the first adhesive web into a first lateral location, and guiding the second adhesive web includes directing the second adhesive web into a second lateral location different from the first lateral location. Alternatively or additionally, guiding the first adhesive web can include flipping the first adhesive web, such that the hot melt adhesive of the first adhesive web is positioned between the fabric web and the backing material of the first adhesive web. The baffle tape can include the first adhesive web positioned proximate an edge of the fabric web and the second adhesive web positioned proximate an opposite edge of the fabric web. The applying step can include passing the first adhesive web, the fabric web, and the second adhesive web through a nip of a belt lamination machine.

In some examples, the method can include: cutting the baffle tape into a plurality of adhesive strips; placing the plurality of adhesive strips in a predetermined arrangement between a first fabric sheet and a second fabric sheet; applying heat and pressure to (i) bond the plurality of adhesive strips to the first fabric sheet and the second fabric sheet and (ii) form a plurality of baffles connecting the first fabric sheet and the second fabric sheet, wherein each baffle includes a non-bonded portion of one of the plurality of adhesive strips. The predetermined arrangement can include the plurality of adhesive strips in a substantially parallel and spaced-apart arrangement. Each adhesive strip from the plurality of adhesive strips can include a Z-shaped cross section.

In certain instances, the first and second fabric sheets and two adjacent baffles define an insulation chamber. The method can include filling the insulation chamber with an insulating material. The method can include removing the backing material from the plurality of adhesive strips prior to placing the plurality of adhesive strips in the predetermined arrangement. The method can be used to manufacture the baffle tape and/or the insulated panel.

In another aspect, the subject matter of this disclosure relates to a system for manufacturing a baffle tape. The system includes: a plurality of adhesive webs including a hot melt adhesive adhered to a backing material; a fabric web including a fabric material; a plurality of rollers for (i) guiding a first adhesive web from the plurality of adhesive webs into a first position proximate a first side of the fabric web and (ii) guiding a second adhesive web from the plurality of adhesive webs into a second position proximate a second side of the fabric web; at least one laminator for applying heat and pressure to form a web of the baffle tape including the first adhesive web bonded to the first side of the fabric web and the second adhesive web bonded to the second side of the fabric web; and a rewinder for rewinding the web of the baffle tape into a roll.

In some examples, the system includes at least one roll of adhesive material for providing the plurality of adhesive webs. The system can include a slitter for slitting an initial adhesive web into the plurality of adhesive webs. Alternatively or additionally, the system can include at least one roll of fabric for providing the fabric web. The system can include a slitter for slitting an initial fabric web into a plurality of fabric webs including the fabric web.

In certain instances, the plurality of rollers can be configured to (i) direct the first adhesive web into a first lateral location and (ii) direct the second adhesive web into a second lateral location different from the first lateral location. The plurality of rollers can be configured to flip the first adhesive web, such that the hot melt adhesive of the first adhesive web is positioned between the fabric web and the backing material of the first adhesive web. The baffle tape can include the first adhesive web positioned proximate an edge of the fabric web and the second adhesive web positioned proximate an opposite edge of the fabric web. The at least one laminator can be or include a belt lamination machine.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

Examples of the systems and methods described herein can be used to manufacture an adhesive tape material that includes a strip of fabric coated with top and bottom strips of adhesive. The adhesive tape can be used to manufacture insulated panels for use in outerwear, sleeping bags, and similar applications. In certain examples, the adhesive tape is referred to herein as "baffle tape."

Figure 1:
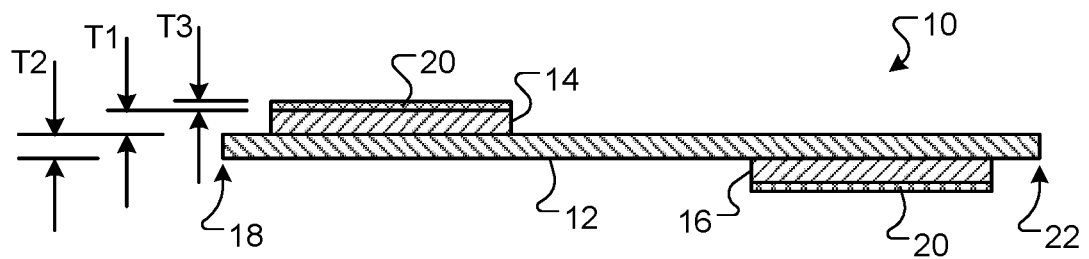
FIG. 1 is a schematic, end view of an adhesive tape that includes a fabric material and two strips of adhesive, in accordance with certain embodiments of the invention.

Referring to FIG. 1, in certain examples, an adhesive tape 10 includes a strip of fabric 12, a top strip of adhesive 14, and a bottom strip of adhesive 16. The top strip 14 of adhesive is positioned near one edge 18 of the strip of fabric 12 and covered with a release paper or backing material 20. The bottom strip of adhesive 16 is positioned along an opposite edge 22 of the strip of fabric and is covered with the backing material 20. A thickness T1 of the top strip of adhesive 14 and/or the bottom strip of adhesive 16 can be, for example, from about 1 mil (25 μm) to about 8 mils (about 200 μm) or preferably from about 2 mils (50 μm) to about 6 mils (150 μm). Example thicknesses for the adhesive tape components are presented in Table 1.

TABLE 1

Exemplary thickness parameters for adhesive tape.

| Parameter | Min. | Typical | Max. |
| --- | --- | --- | --- |
| T1, thickness of adhesive strip (μm) | 25 | 100 | 200 |
| T2, thickness of fabric (μm) | 50 | 150 | 250 |
| T3, thickness of backing material (μm) | 25 | 100 | 150 |

Figure 2:
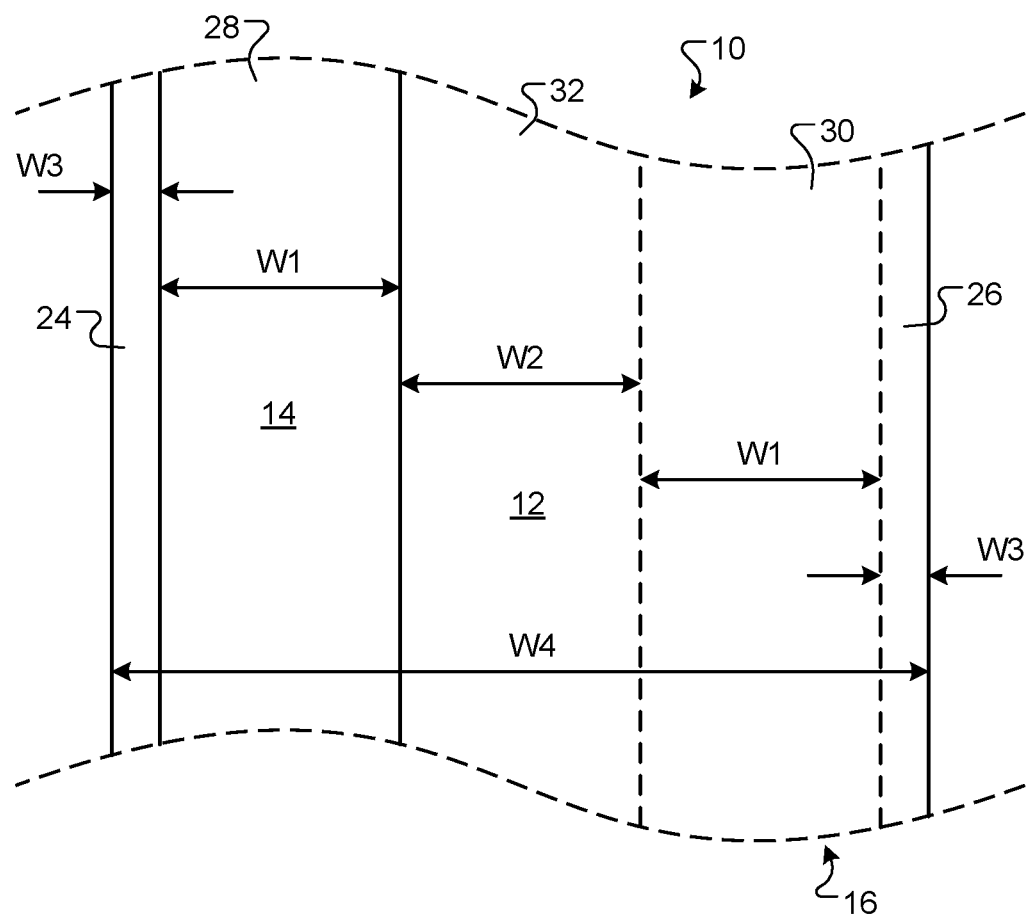
FIG. 2 is a schematic, top view of the adhesive tape of FIG. 1, in accordance with certain embodiments of the invention.

Referring to FIG. 2, in some examples, the adhesive tape 10 includes uncoated outer portions of fabric 24 and 26, a top adhesive portion 28 (corresponding to the top strip of adhesive 14), a bottom adhesive portion 30 (corresponding to the bottom strip of adhesive 16), and a central uncoated portion of fabric 32. A width W1 of the top strip of adhesive 14 and/or the bottom strip of adhesive 16 can be, for example, from about 2 mm to about 25 mm, preferably from about 4 mm to about 10 mm, or most preferably from about 4 mm to about 6 mm. Example widths for each portion of the adhesive tape 10 are presented in Table 2. In some instances, approximately 30% of each side of the strip of fabric 12 is covered with adhesive.

TABLE 2

Exemplary width parameters for adhesive tape.

| Parameter | Min. | Typical | Max. |
| --- | --- | --- | --- |
| W1, width of adhesive strip (mm) | 2 | 5 | 25 |
| W2, width of central uncoated fabric portion (mm) | 2 | 10 | 60 |
| W3, width of outer uncoated fabric portion (mm) | 0 | 1 | 2 |
| W4, width of adhesive tape (mm) | 6 | 22 | 114 |

In various implementations, the strip of fabric 12 is or includes a synthetic or natural woven or non-woven fabric material. Additionally or alternatively, the strip of fabric 12 can have a weft stretch component that permits the strip of fabric 12 to be stretched, for example, by about 5%, about 10%, about 20%, from about 5% to about 20%, or from about 5% to about 80%. The fabric material can be or include a mesh fabric, which can have holes that range in diameter from about 1 mil (25 µm) to about 30 mils (760 µm) and/or can have an average diameter of about 15 mils (380 µm). A minimum air permeability of the fabric material can be about 0.5 cfm or from about 0.5 cfm to about 43 cfm, as measured by FRAZIER air permeability, for example, using FRAZIER machine number 5348 manufactured by FRAZIER PRECISION INSTRUMENT CO., Inc. FRAZIER air permeability measurements are generally performed by applying a vacuum to a fabric sample and measuring a flowrate of air that passes through sample.

In certain examples, the top and bottom adhesive strips 14 and 16 can be or include an adhesive material, such as one or more thermoplastic or thermoset adhesives. The adhesive material can be or include, for example, one or more polyurethanes, polyesters, polyamides, polyolefins, or any blend thereof. Thermal properties of the adhesive material can include, for example, thermomechanical analysis (TMA) onset points in a range from about 50° C. to about 160° C., preferably in a range from about 50° C. to about 90° C., and most preferably in a range from about 50° C. to about 70° C. The top and bottom adhesive strips 14 and 16 preferably bond to the strip of fabric 12 with an average peel strength of at least 3 lb/in, as measured in a T-peel test in which a rate of extension is 300 mm/min and a sample temperature is 18-22° C., or preferably 20° C. (see ASTM D1876-01).

The top and bottom adhesive strips 14 and 16 can be formed initially on the backing material 20 by extrusion, solvent coating, or aqueous coating. The backing material 20 can be or include a paper or polymeric material and/or can have a coating of non-stick or low surface energy material such as, for example, polytetrafluoroethylene (PTFE) or silicone.

Figure 3:
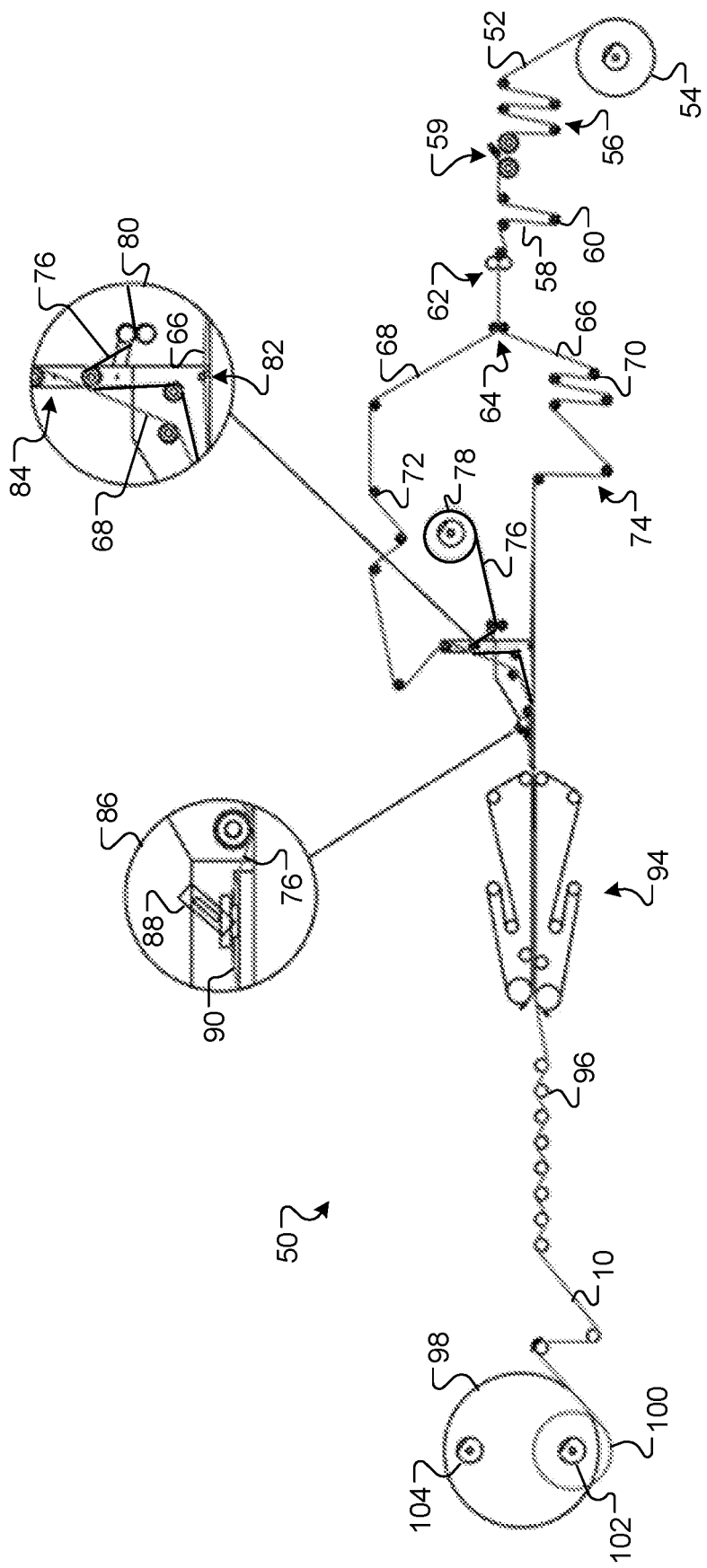
FIG. 3 includes a schematic, side view of a process for manufacturing an adhesive tape, in accordance with certain embodiments of the invention.

FIG. 3 is a schematic side view of an example process 50 for manufacturing the adhesive tape 10. An adhesive web 52 is provided from an adhesive roll 54 and includes a backing material (e.g., the backing material 20) coated with a bottom layer of adhesive material (e.g., the adhesive material included in the top and bottom adhesive strips 14 and 16). The adhesive web 52 is guided by a plurality of rollers 56 and slit into a plurality of adhesive webs 58 by a slitter 59, which can include, for example, a knife, a rotary blade, a rotary die cutter, and/or a shear knife blade assembly. The plurality of adhesive webs 58 are wrapped around a tension roller 60 for controlling and/or measuring web tension. The tension roller 60 may include or be in communication with a tension sensor that measures web tension. The plurality of adhesive webs 58 are guided through a nip formed by a pair of rubber rollers 62 that pull the adhesive webs 58 and maintain a desired web velocity. After passing through a pair of rubber guide rollers 64, one or more bottom adhesive webs 66 from the plurality adhesive webs 58 diverge from one or more top adhesive webs 68 from the plurality of adhesive webs 58. For example, every other web from the plurality of adhesive webs 58 can be diverted to form the bottom adhesive webs 66 and the remaining webs can be diverted to form the top adhesive webs 68. In one implementation, there are 52 adhesive webs 58, 26 bottom adhesive webs 66, and 26 top adhesive webs 68, though other numbers of webs can be used. Additional tension rollers 70 and 72 (e.g., with tension sensors) are provided for controlling and/or measuring tension in the one or more bottom adhesive webs 66 and the one or more top adhesive webs 68, respectively. Each of the one or more bottom adhesive webs 66 is preferably flipped over at a twist location 74, for example, by twisting each bottom adhesive web 66. At this point, the adhesive material is on a top side of the one or more bottom adhesive webs 66 and on a bottom side of the one or more top adhesive webs 68.

Figure 4:
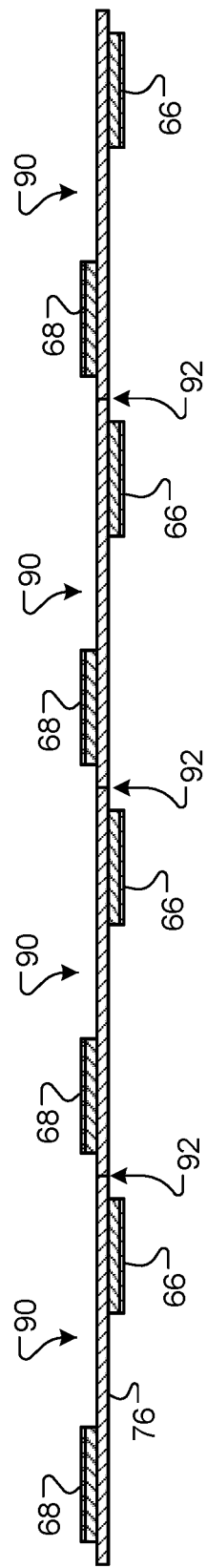
FIG. 4 is a schematic, end view of a fabric web and multiple strips of adhesive, in accordance with certain embodiments of the invention.

A fabric web 76 is provided from a fabric roll 78 and guided into position between the one or more bottom adhesive webs 66 and the one or more top adhesive webs 68. As shown in a magnified view 80, a plurality of sensors 82 and 84 (e.g., optical sensors and/or tension sensors) are used to monitor the one or more bottom adhesive webs 66 and the one or more top adhesive webs 68, for example, to ensure webs are properly positioned and remain intact. If the plurality of sensors 82 and 84 detects a broken web, for example, the process 50 can be stopped (e.g., automatically) so that the broken web can be repaired. As shown in a second magnified view 86, a fabric slitter 88 (e.g., an ultrasonic slitter) is used to slit the fabric web 76 into a plurality of separate fabric webs 90. For example, referring to FIG. 4, the fabric web 76 can be slit by the fabric slitter 88 at three or more slit locations 92 to form four or more separate fabric webs 90. Each separate fabric web 90 can be associated with a top adhesive web 68 positioned along one edge of the separate fabric web 90 and a bottom adhesive web 66 positioned along an opposite edge of the separate fabric web 90. One or more web guiding devices, including steering rollers, profiled rollers, grooved rollers, and/or one or more alignment guides (e.g., positioned near the fabric slitter 88), can be used to guide each top and bottom adhesive web 66 and 68 into a desired position (e.g., a lateral position and/or a separation distance) relative to the fabric web 76 and/or the separate fabric webs 90.

Referring again to FIG. 3, after the separate fabric webs 90, the bottom adhesive webs 66, and the top adhesive webs 68 have been guided into desired relative positions, the webs are passed through one or more laminators 94 that apply heat and pressure to bond the bottom and top adhesive webs 66 and 68 to the separate fabric webs 90. The one or more laminators 94 can be or include, for example, a heated belt laminator, such as Model No. HP600LF, manufactured by HASHIMA Co. Ltd, though other laminators can be used. In some examples, the one or more laminators 94 include a first laminator for bonding the top adhesive webs 68 to the separate fabric webs 90 and a second laminator for bonding the bottom adhesive webs 66 to the separate fabric webs 90.

At an exit of the one or more laminators 94, a plurality of webs of adhesive tape 10 are wrapped around a series of festoon rollers 96 and fed into a rewinder 98 (e.g., a differential rewinder) where the webs of adhesive tape 10 are wound into rolls 100 on a first set of spools 102. When the first set of spools 102 reaches a desired size, the webs of adhesive tape 10 can be cut and moved to a second set of spools 104.

Figure 5:
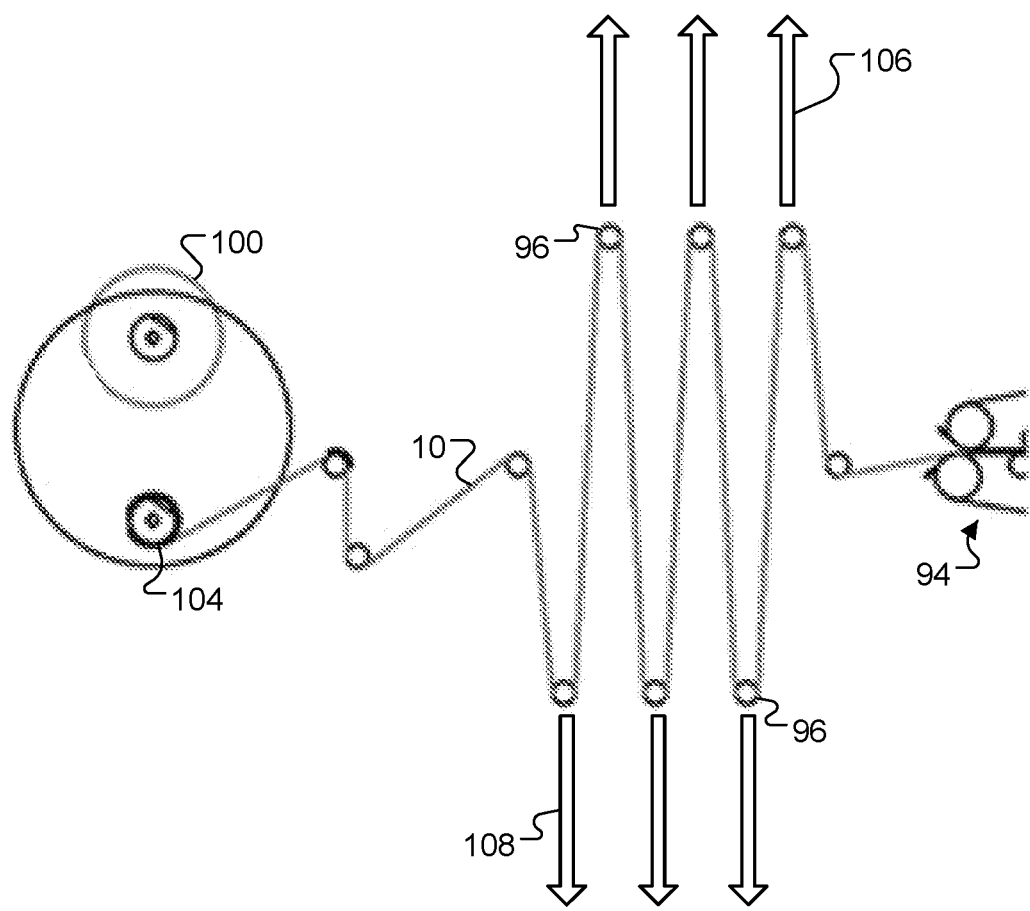
FIG. 5 is a schematic, side view of a rewinder used in a process for manufacturing an adhesive tape, in accordance with certain embodiments of the invention.

Referring to FIG. 5, while the webs of adhesive tape 10 are being moved to the second set of spools, and/or as the second set of spools 104 are being accelerated to web speed, the series of festoon rollers 96 can be translated apart from one another to store extra web material that the second set of spools 104 is unable to receive. For example, every other roller among the festoon rollers 96 can translate in an upward direction 106 while the remaining festoon rollers 96 translate in a downward direction 108. This increases a length of a web path and allows web material to accumulate between the festoon rollers 96. Once the webs of adhesive tape 10 are transferred to the second set of spools 104 (e.g., using a pressure-sensitive adhesive), and/or the second set of spools 104 has reached a desired rewind speed, the festoon rollers 96 can translate back to initial locations, as shown in FIG. 3, and any extra web stored between the festoon rollers 96 can be wound onto the second set of spools 104.

Figure 6:
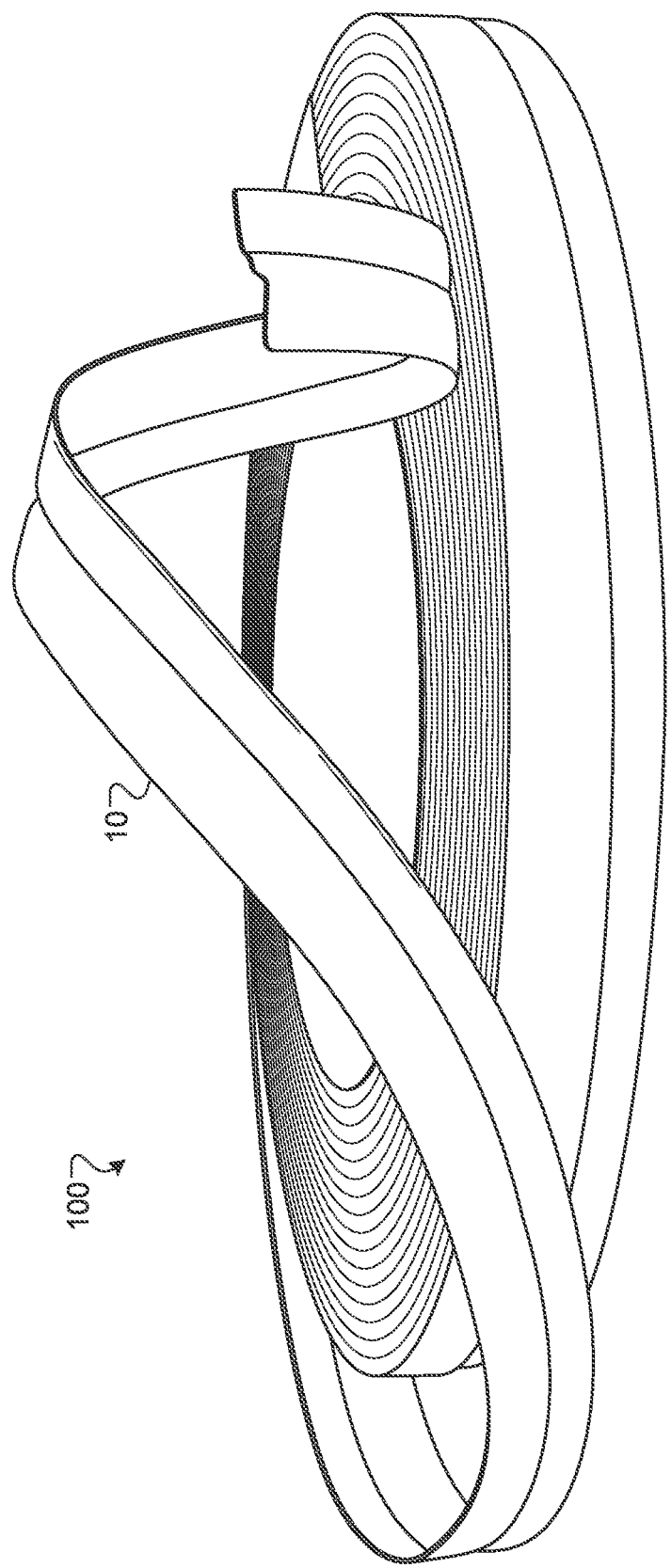
FIG. 6 is a perspective photograph of a roll of an adhesive tape, in accordance with certain embodiments of the invention.

FIG. 6 includes a photograph of an example roll 100 of adhesive tape 10 that can be made using the process 50. A strip of the adhesive tape 10 can be unwound from the roll 100 and cut to a desired length.

Referring again to FIG. 3, in various alternative examples, the slitter 59 is not used and the plurality of adhesive webs 58 can be obtained from a plurality of adhesive rolls 54. Additionally or alternatively, use of the fabric slitter 88 can be avoided by providing the separate fabric webs 90 from a plurality of fabric rolls 78. In some instances, the fabric slitter 88 can be positioned after the one or more laminators 94 to slit the fabric web 76 after the top and bottom adhesive webs 66 and 68 have been bonded to the fabric web 76. Additionally or alternatively, one or more rolls 100 of the adhesive tape 10 can be cut into multiple rolls 100.

As the process 50 continues and the sources for the adhesive web 52 and/or the fabric web 76 are reduced, the adhesive roll 54 and/or the fabric roll 78 may need to be replaced, for example, using a splicing procedure. In preferred implementations, an old roll can be replaced with a new roll by splicing a new web from the new roll onto an old web from the old roll. Once the new web is attached to the old web, the old web can be cut and the old roll can be removed. The splicing procedure is preferably performed without stopping the process 50.

Figure 7:
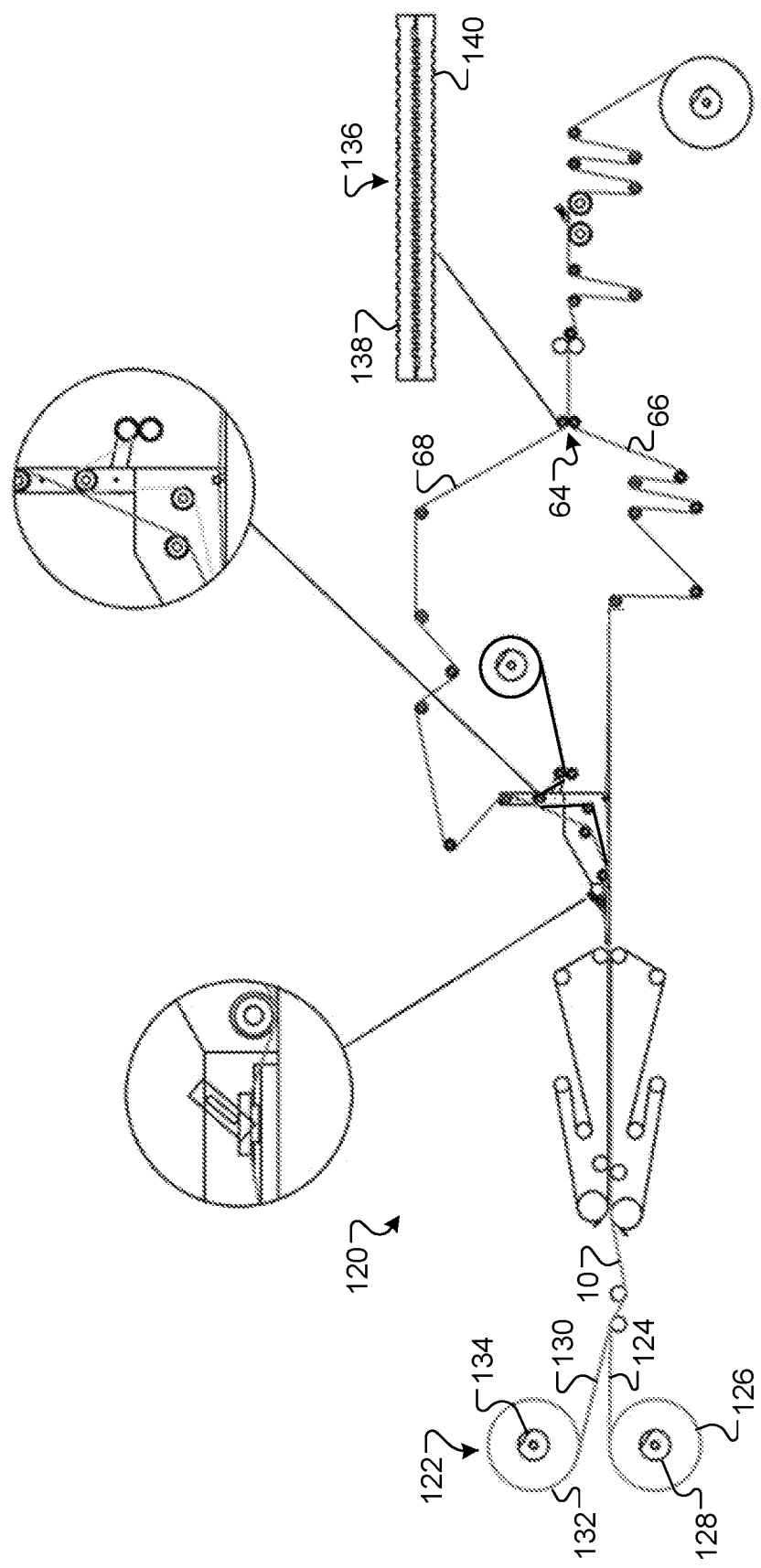
FIG. 7 includes a schematic, side view of a process for manufacturing an adhesive tape, in accordance with certain embodiments of the invention.

FIG. 7 is a schematic side view of an alternative process 120 for manufacturing the adhesive tape 10. The alternative process 120 utilizes a rewinder 122 in which one or more first webs 124 of adhesive tape 10 are wound onto a first roll 126 on a first spool 128 and one or more second webs 130 of adhesive tape 10 are wound simultaneously onto a second roll 132 on a second spool 134. When the first and second rolls 126 and 132 reach a desired size, the process 120 can be stopped and the first and second webs 124 and 130 can be cut, to allow the first and second rolls 126 and 132 to be removed. New rolls can be created by attaching the cut first and second webs 124 and 130 to the first and second spools 128 and 134, respectively, and restarting the process 120.

Referring to a separate front view 136 in FIG. 7, in some examples, the rubber guide rollers 64 include a top guide roller 138 and a bottom guide roller 140 that are profiled or grooved to guide the one or more top adhesive webs 68 and the one or more bottom adhesive webs 66. The profile of each roll can include an outer diameter that oscillates along a length of the roll between a minimum value and a maximum value. The oscillation can be or approximate, for example, a square wave or a sine wave. In the depicted example, the profiles of the top and bottom guide rollers 138 and 140 can be meshed together, such that the diameter of one roller is generally at the maximum value in lateral locations where the diameter of the other roller is at the minimum value. The top adhesive webs 68 are preferably wrapped around portions of the top guide roller 138 in lateral locations where the diameter of the top guide roller 138 is at the maximum value. The bottom adhesive webs 66 are preferably wrapped around portions of the bottom guide roller 140 in lateral locations where the diameter of the bottom guide roller 140 is at the maximum value.

Figure 8:
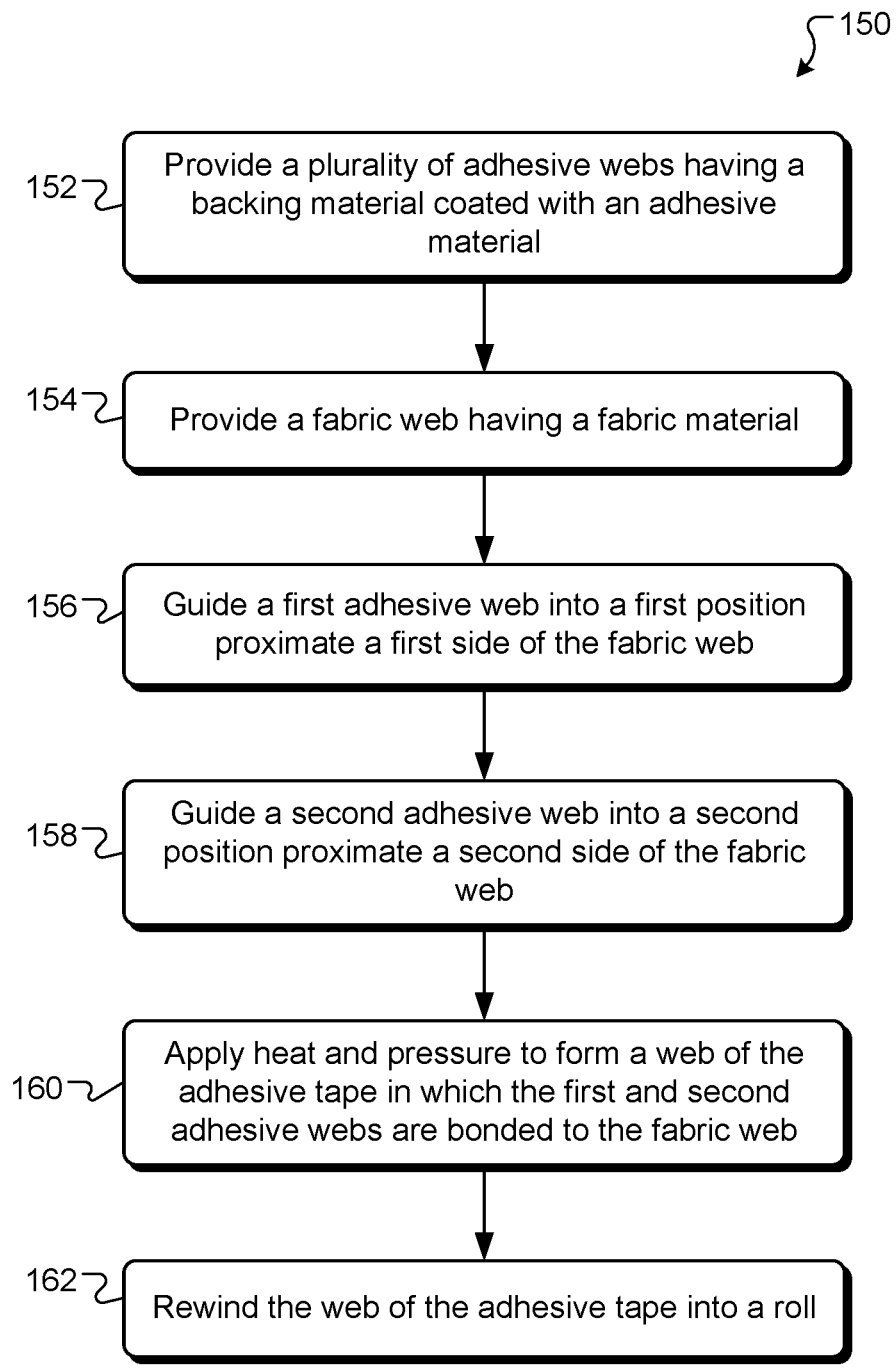
FIG. 8 is a flowchart of a method of manufacturing an adhesive tape, in accordance with certain embodiments of the invention.

FIG. 8 is a flowchart of an example method 150 of manufacturing an adhesive tape (e.g., the adhesive tape 10). A plurality of adhesive webs are provided (step 152) that include an adhesive material (e.g., a hot melt adhesive) adhered to a backing material. A fabric web is provided (step 154) that includes a fabric material. A first adhesive web from the plurality of adhesive webs is guided (step 156) into a first position proximate a first side of the fabric web. A second adhesive web from the plurality of adhesive webs is guided (step 158) into a second position proximate a second side of the fabric web. Heat and pressure are applied (step 160) to form a web of the adhesive tape (also referred to as baffle tape) having the first adhesive web bonded to the first side of the fabric web and the second adhesive web bonded to the second side of the fabric web. The web of the adhesive tape is wound (step 162) into a roll.

Figure 9:
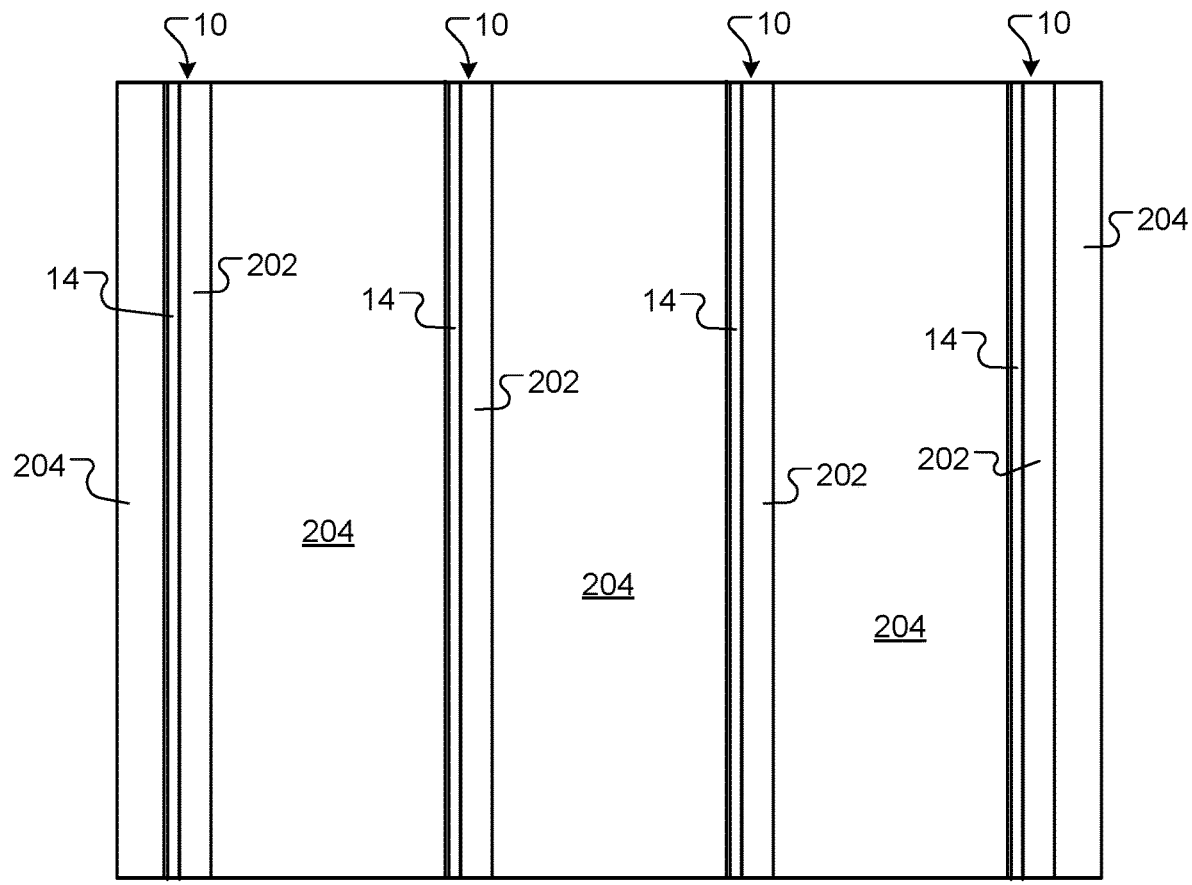
FIG. 9 is a schematic, top view of a plurality of strips of adhesive tape on a sheet of fabric, in accordance with certain embodiments of the invention.
Figure 10:
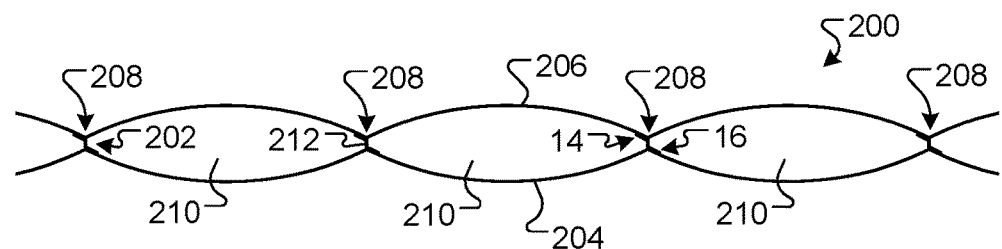
FIG. 10 is a schematic, end view of an insulated panel formed using an adhesive tape, in accordance with certain embodiments of the invention.

Referring to FIGS. 9 and 10, in certain examples, the adhesive tape 10 can be used to form an insulated panel 200 for use in outerwear (e.g., down jackets), sleeping bags, and similar articles. The insulated panel 200 can be formed by cutting the adhesive tape 10 into a plurality of strips 202 and placing the strips 202 onto a bottom sheet of fabric 204. As depicted in FIG. 9, the strips 202 can be arranged to be parallel to one another and evenly spaced, though other arrangements may be desirable. For example, one or more of the strips 202 could be substantially perpendicular to another strip (or placed at other angles, e.g., 45 degrees) and/or could overlap with one or more other strips 202. The depicted example shows the strips 202 of adhesive tape 10 being positioned with the top strip of adhesive 14 facing away from the bottom sheet of fabric 204 and the bottom strip of adhesive 16 (not shown) facing toward the bottom sheet of fabric 204. Any backing material (e.g., backing material 20) is preferably removed from the strips 202 prior to placing the strips 202 on the bottom sheet of fabric 204.

Referring to FIG. 10, with the strips 202 of adhesive tape 10 in the desired arrangement, a top sheet of fabric 206 can be positioned on top of the bottom sheet of fabric 204, such that the strips 202 are between the bottom sheet of fabric 204 and the top sheet of fabric 206. Heat and pressure can then be applied (e.g., in a laminator or heat press) to bond the top strip of adhesive 14 to the top sheet of fabric 206 and the bottom strip of adhesive 16 to the bottom sheet of fabric 204. The bonding process forms a plurality of seams 208 that define edges of chambers 210 between the bottom and top sheets of fabric 204 and 206. The chambers 210 can be filled with an insulating material, such as down feathers, loose synthetic insulation, or synthetic batting. A non-bonded portion of the adhesive tape 10 (e.g., the central uncoated portion of fabric 32) connects the bottom and top sheets of fabric 204 and 206 in each seam 208 and serves as a baffle 212 that prevents insulating material from moving between adjacent chambers 210. The bottom and top sheets of fabric 204 and 206 can be or include, for example, low denier (e.g., 10D) polyester or nylon fabric for use in lightweight down jackets or coated outerwear fabric for use in heavier weight down jackets.

Figure 11:
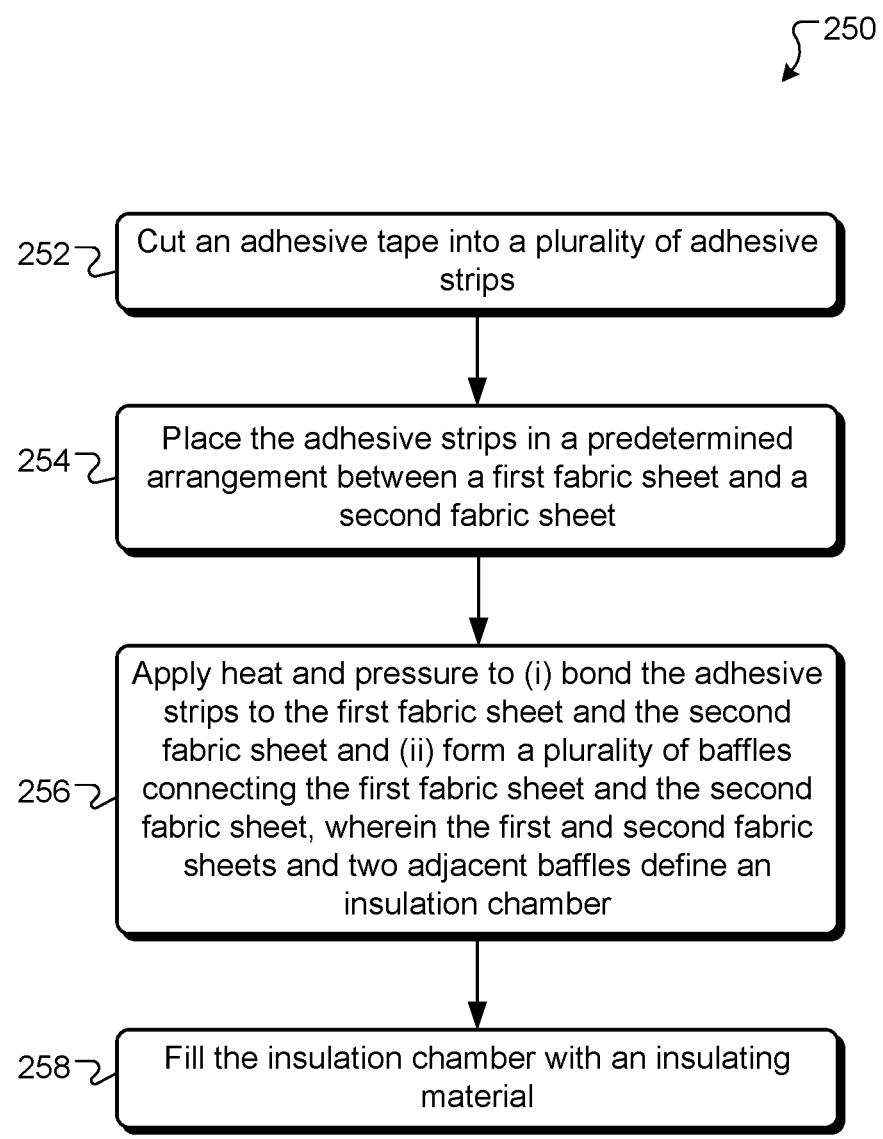
FIG. 11 is a flowchart of a method of manufacturing an insulated panel using an adhesive tape, in accordance with certain embodiments of the invention.

FIG. 11 is a flowchart of an example method 250 of manufacturing an insulated panel (e.g., the insulated panel 200) using an adhesive tape (e.g., the adhesive tape 10). The adhesive tape is cut (step 252) into a plurality of adhesive strips. The plurality of adhesive strips are placed (step 254) in a predetermined arrangement between a first fabric sheet and a second fabric sheet. Heat and pressure are applied (step 256) to (i) bond the plurality of adhesive strips to the first fabric sheet and the second fabric sheet and (ii) form a plurality of baffles connecting the first fabric sheet and the second fabric sheet. Each of the baffles is or includes a non-bonded portion of one of the plurality of adhesive strips. The first and second fabric sheets and two adjacent baffles define an insulation chamber that is filled (step 258) with an insulating material.

Compared to previous seam designs, which are typically formed by stitching top and bottom sheets of fabric together, the seams 208 formed using the adhesive tape 10 provide several advantages. For example, the fabric material of the adhesive tape 10 is designed to be permeable, such that air can flow easily through the baffles 212, from one chamber 210 to another. This helps prevent sudden over pressurizing and/or rupture of any one chamber 210 and reduces a likelihood that insulating materials (e.g., down feathers) will poke out of or pass through the bottom sheet of fabric 204 and/or the top sheet of fabric 206. Air permeability at the baffles 212 can also make it easier to compress the insulating panel 200, such that down jackets, sleeping bags, or other articles that include the insulating panel 200 can be more easily reduced in size, for example, for storage in a suitcase or other container. Additionally, the fabric material of the adhesive tape 10 is preferably stretchable, for example, in a weft or cross-direction. The stretchable nature of the fabric material can make the seams 208 more durable and able to withstand greater stresses and/or more wear and tear. Another advantage is that the seams 208 are generally warmer than conventional seams formed by stitching. For example, unlike conventional seams, which are thin and generally unable to accommodate insulating materials, the seams 208 produced with the adhesive tape 10 are generally thicker (e.g., due to the baffles 212) and able to accommodate at least some of the insulating materials. This results in warmer seam regions and reduces the need to compensate for cold seams by making the chambers 210 thicker. Accordingly, jackets, sleeping bags, and other items that include the insulating panel 200 can have thinner chambers 210 and/or can use less insulating material, compared to conventional panels, to achieve a desired warmth or thermal resistance. Further, by eliminating the need for stitching, the seams 208 can be produced with no stitching holes, which can be a source of heat loss or water penetration and/or can permit insulating materials to protrude or pass through fabric layers.

Figure 12:
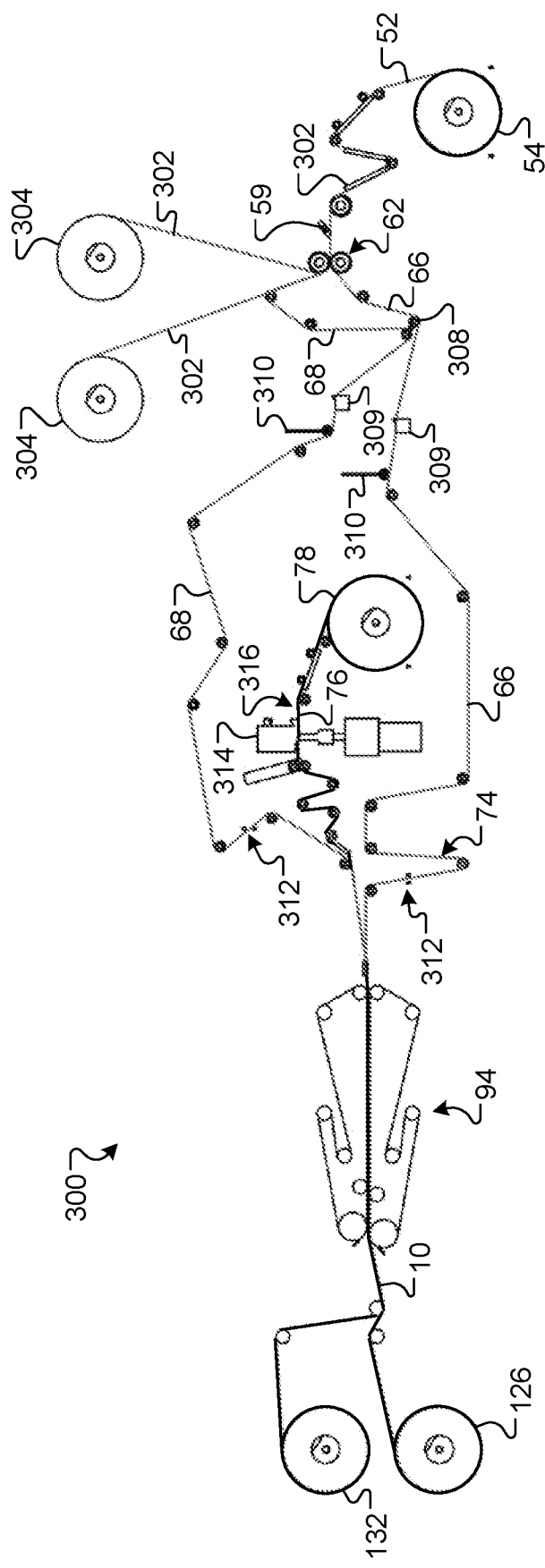
FIG. 12 includes a schematic, side view of a process for manufacturing an adhesive tape, in accordance with certain embodiments of the invention.

FIG. 12 is a schematic side view of an alternative process 300 for manufacturing the adhesive tape 10. The alternative process 300 utilizes one or more cooling plates 302 that cool the adhesive web 52 to a desired temperature (e.g., at or below room temperature) prior to being slit by the slitter 59. The cooling plates 302 can help keep the adhesive material in a solid state during the slitting process and/or subsequent steps. Webs of edge trim material 302 created by the slitter 59 are wound onto a pair of edge trim rewinder rolls 304. A dancer roll assembly 308 or similar device is used to adjust and/or control tension or web speed in the one or more bottom adhesive webs 66 and the one or more top adhesive webs 68. Web guides 309 (e.g., guide bars) can be used to guide the bottom and top adhesive webs 66 and 68 to desired lateral locations (e.g., in a cross-web direction). The web guides 309 can include, for example, alignment slots or channels that control or define a lateral position of each individual web. Tension sensors 310 can be used to provide, monitor, and/or control tension in the bottom and top adhesive webs 66 and 68. In some instances, for example, the tension sensors 310 can provide tension (e.g., using one or more springs or actuators) to individual bottom and top adhesive webs 66 and 68 and/or provide a machine operator with a visual indication of a tension setting in each web. Additionally or alternatively, optical sensors 312 can be used to guide and/or detect breakage of the bottom and top adhesive webs 66 and 68. As in the process 50, described above, the bottom adhesive webs 66 can be flipped over at the twist location 74.

In the depicted example, the fabric web 76 is slit using an ultrasonic slitter 314 or similar device prior to being guided into position relative to the bottom and top adhesive webs 66 and 68. After passing through the laminator 94, the adhesive tape 10 is wound onto the first and second rolls 126 and 132, as described above for the process 120.

In preferred implementations, the process 300 can be controlled using signals from a collection of process sensors, including the tension sensors 310 and/or the optical sensors 312. When one of the bottom adhesive webs 66 or the top adhesive webs 68 breaks or becomes jammed, for example, the tension sensors 310 may detect a sudden drop in web tension and/or the optical sensors 312 may no longer detect the presence of a web. In such an instance, a control system can automatically stop the process 300 and/or can alert a machine operator to take corrective action. It is generally desirable to stop the process 300 quickly in such instances, to minimize waste and/or avoid the creation of defective product. The process 300 can be restarted once the broken web is repaired. Additionally or alternatively, the control system can provide automatic web tension and/or speed control. In preferred implementations, for example, a drive speed of the rubber rollers 62 can be matched or aligned with a drive speed in the laminator 94, to ensure consistent speeds and/or tensions for the web materials. Likewise, the tension sensors 310 can monitor and/or control web tensions. Corrective action (e.g., a process stoppage) can be taken when web tension falls outside an acceptable range, for example, when a web has a loss of tension.

Additionally or alternatively, one or more sensors can be included to monitor quantities of input and/or output materials. For example, one or more sensors (e.g., length counters) can monitor the adhesive roll 54 and/or the fabric roll 78 to determine when adhesive and/or fabric supplies are running low. The process 300 can be stopped and new supply rolls can be installed when a threshold limit is reached. Likewise, one or more sensors (e.g., length counters) can monitor the first and second rolls 126 and 132 to determine when a desired output volume (e.g., 150 meters per roll) of the adhesive tape 10 has been reached. The first and second rolls 126 and 132 can then be removed and new output rolls of the adhesive tape 10 can be started, for example, on new cores. In certain examples, a new adhesive roll 54 can be about 240 mm wide and contain about 300 meters of adhesive web material. Likewise, a new fabric roll 78 can be about 470 mm wide and contain about 300 meters of fabric web material. Other roll sizes can be used.

In some instances, the process 300 can provide a marking or some other indication on the product materials to flag a portion of the adhesive tape 10 output as being defective. A marking system 316, for example, can add a mark (e.g., with ink or paint) to the fabric web 76 during machine startup or when other circumstances (e.g., a web break, misaligned webs, or poor lamination) result in defective product. This can allow machine operators to more easily separate the defective product (e.g., an initial portion of the first and second rolls 126 and 132) from the remaining product. Alternatively or additionally, the process 300 can utilize a sensor that detects the mark and automatically diverts bad product to a waste container.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. An insulated panel comprising:
   a top fabric sheet;
   a bottom fabric sheet;
   an insulating material disposed between the top fabric sheet and the bottom fabric sheet; and
   at least one strip of adhesive tape forming at least one baffle connecting the top fabric sheet and the bottom fabric sheet, the at least one strip of adhesive tape comprising:
   a strip of fabric material;
   a top strip of adhesive bonded to a top side of the strip of fabric material in a first lateral location along a width of the strip of fabric material and extending along a length direction; and
   a bottom strip of adhesive bonded to a bottom side of the strip of fabric material in a second lateral location along the width and extending along the length direction, the second lateral location different from the first lateral location,
   wherein the top strip of adhesive is bonded to the top fabric sheet and the bottom strip of adhesive is bonded to the bottom fabric sheet.

2. The insulated panel of claim 1, wherein at least one of the top fabric sheet or the bottom fabric sheet comprises a polyester fabric or a nylon fabric.

3. The insulated panel of claim 1, wherein the insulating material comprises at least one of down feathers, loose synthetic insulation, or synthetic batting.

4. The insulated panel of claim 1, wherein the strip of fabric material comprises a central uncoated portion along the width between the first lateral location and the second lateral location.

5. The insulated panel of claim 1, wherein the top and bottom strips of adhesive comprise a hot melt adhesive material.

6. The insulated panel of claim 5, wherein the hot melt adhesive material comprises one or more polyurethanes, polyesters, polyamides, polyolefins, or any blend thereof.

7. The insulated panel of claim 1, wherein the at least one strip of adhesive tape comprises a Z-shaped cross section.

8. The insulated panel of claim 1, wherein the at least one strip of adhesive tape comprises a plurality of strips of adhesive tape bonded to the top fabric sheet and the bottom fabric sheet in a predetermined arrangement.

9. The insulated panel of claim 8, wherein the predetermined arrangement comprises the plurality of adhesive strips in a substantially parallel and spaced-apart arrangement.

10. The insulated panel of claim 1, wherein the fabric material comprises a woven or non-woven fabric material.

11. The insulated panel of claim 1, wherein the fabric material comprises a synthetic or natural fabric material.

12. The insulated panel of claim 1, wherein the fabric material comprises a mesh fabric.

13. The insulated panel of claim 1, wherein the fabric material comprises a stretchable fabric that can be stretched in an amount from about 5% to about 80%.

14. The insulated panel of claim 1, wherein the strip of fabric material comprises uncoated outer portions along outer edges of the width of the strip of fabric material.

15. The insulated panel of claim 1, wherein the top and bottom fabric sheets, the insulating material, and the at least one baffle define an insulation chamber.

16. The insulated panel of claim 15, wherein the insulation chamber forms a portion of a garment or outerwear.

17. The insulated panel of claim 15, wherein the insulation chamber forms a portion of a sleeping bag.

18. The insulated panel of claim 1, wherein the at least one strip of adhesive tape was obtained from a roll of the adhesive tape.

19. The insulated panel of claim 1, wherein the bond between the top strip of adhesive and the top fabric sheet and the bond between the bottom strip of adhesive and the bottom fabric sheet were obtained by applying heat and pressure to the top strip of adhesive and the bottom strip of adhesive.

* * * * *